United States Patent [19]

Taplay

[11] 4,352,272
[45] Oct. 5, 1982

[54] HEAT PUMP SYSTEM

[76] Inventor: James W. Taplay, 62 Salem Ave., Hamilton, Ontario, Canada, L9A 3W3

[21] Appl. No.: 137,036
[22] Filed: Apr. 3, 1980
[51] Int. Cl.³ .................... F25B 27/00; F25B 41/04
[52] U.S. Cl. .................................. 62/235.1; 62/217; 62/276; 62/151
[58] Field of Search ............... 62/217, 117, 80, 275, 62/276, 150, 151, 2

[56] References Cited

U.S. PATENT DOCUMENTS

| | | | |
|---|---|---|---|
| 2,616,268 | 11/1952 | Heintzen | 62/217 |
| 2,709,342 | 5/1955 | Zearfoss, Jr. | 62/275 |
| 3,977,207 | 8/1976 | Scherer et al. | 62/217 |

FOREIGN PATENT DOCUMENTS 620951  4/1949  United Kingdom ............... 62/276

Primary Examiner—Albert J. Makay
Assistant Examiner—Harry B. Tanner
Attorney, Agent, or Firm—Hirons, Rogers & Scott

[57] ABSTRACT

The invention provides a heat pump system employing a refrigerant charged space and including at least two evaporators, one of which is an ambient air head absorber, and the other of which can be of the same type, or of the type obtaining heat from solar insolation, water, ground heat, etc. The coil or coils of an ambient air absorber must be defrosted periodically. In the system of the invention defrost heat is applied to the evaporator coil or coils while the compressor is operating, such defrost heat causing vaporization of the refrigerant therein. The system includes a pressure containment valve between the evaporator and the compressor that maintains the vapor pressure of the vaporizing liquid in the coil above the value at which the ice will readily melt, the valve releasing excess vapor to the compressor and then to the condenser which discharges the heat to the space to be heated. Thus, the only part of the defrost heat lost from the system is that required to melt the ice. Preferably the evaporator is an ambient air unit paralleled by one or more solar heat absorber evaporators which do not require defrosting, so that the compressor can work efficiently and continuously with the refrigerant from the solar absorber. The system may include heat exchangers enabling the heat obtained to be used for different purposes. The system also works on a cooling cycle when required by suitable change over valve means.

8 Claims, 1 Drawing Figure

HEAT PUMP SYSTEM

FIELD OF THE INVENTION

This invention is concerned with improvements in or relating to heat pump systems, especially to such systems including defrost means for the coil of an evaporator heat absorber, and more especially to such systems including at least one solar heat absorber in parallel with an ambient air evaporator heat absorber.

REVIEW OF THE PRIOR ART

The principles and technology of mechanical refrigeration systems are well known and highly developed; such systems provide long and trouble free service when properly installed and maintained. Similarly heat pump principles and technology developed from mechanical refrigeration and its later derivative, air conditioning, are well known and high developed. Such systems as commonly marketed usually employ an outdoor ambient air heat exchanger combined with one indoor heat exchanger and associated piping and control equipment. The function of these exchangers can be reversed as required by operation of the control equipment to either heat or cool an indoor enclosed area by reversing the refrigerant cycle. During the season when heating is required, their function is reversed from time to time by various sensing and timing devices in order to melt off the ice on the outdoor heat exchanger by a process known as "hot gas defrost".

Unfortunately, this defrost arrangement leads to many problems, such as flood back of liquid refrigerant to the compressor with consequent compressor failure, and so on. Also, heat must be removed from the indoor area via its heat exchanger in order to provide the hot gas needed to melt the accumulated ice on the outdoor exchanger, resulting in considerable inefficiency. That is to say, the same heat which has just been brought into the heat space with the attendant energy cost and wear factor on the equipment is now removed from the heated space and lost to the outside. This is in effect a double waste of electrical energy with no useful heat gain to the indoor space.

Because of their great potential, many solar radiant energy absorption systems are now under intensive development. These systems tend to be somewhat exotic and expensive employing photo-voltaic conversion, fluid collector plate systems, air collector plate systems, and refrigerant absorption systems, with or without special tracking arrangements to maintain the collectors facing the sun, and with or without special collector shapes for more efficient collection. Heat pumps have been combined with solar collection systems using the more or less standard solar system as a heat source for a fluid type heat pump. Such systems tend to be extremely expensive to install and to be maintenance-intensive due to their complexity.

DEFINITION OF THE INVENTION

It is the principal object of the invention to provide a new highly efficient and versatile heat pump system.

In accordance with the present invention there is provided a heat pump system comprising:

(a) first and second heat exchangers having respective first and second refrigerant receiving spaces and operative in the system heating mode as respective refrigerant evaporators extracting heat from their surroundings with vaporization of liquid refrigerant therein;

(b) a third heat exchanger having a respective third refrigerant receiving space and also operative in the system heating mode as a refrigerant condenser so as to deliver heat to its surroundings;

(c) a refrigerant compressor;

(d) pipe means connecting the said first, second and third exchangers and the compressor to receive vaporized refrigerant from said first and second exchangers and to deliver compressed refrigerant to the third exchanger;

(e) defrost heat supply means for supply of defrost heat to at least the said first exchanger space;

(f) a pressure containment valve between the first exchanger space and the compressor and when operative adapted to maintain the refrigerant vapor in the first space at a pressure and temperature above that at which defrosting will take place, and to release refrigerant vapor at a greater pressure to the compressor; and (g) control means operative to produce a defrost cycle, said control means actuating the said defrost heat supply means to supply defrost heat to the first space and also rendering the pressure containment valve operative.

This new and novel approach using an evaporator pressure containment valve in conjunction with the defrost system allows many new and novel adaptions of existing technology not previously known and results in a superior heat pump system.

A preferred embodiment of the invention is a solar heat pump employing an outdoor ambient air refrigerant evaporator as one heat absorber in combination with a solar radiation refrigerant evaporator as a parallel heat absorber, both evaporators using a fluorinated hydrocarbon refrigerant as the operative medium. The solar absorber may for example be a direct expansion flat plate solar isolation heat absorber panel, and preferably the refrigerant employed is that sold by DuPont Inc. under the Trade Mark "FREON 502", the panel being located on the roof of the structure to be heated or arranged as a remote structure. Unlike the ambient air type absorber such a solar absorber can build up frost without obvious operation impairments and therefore does not normally require defrosting, so that the common compressor can be operated continuously without damage, since the solar collector is always available to provide heated refrigerant vapor to the compressor.

The system also preferably has separate indoor condenser and evaporator heat exchangers for indoor heating and cooling respectively, together with refrigerant to liquid heat exchangers in which hot water is heated by the compressed refrigerant as it is condensed for various uses requiring such heat energy. In the heating mode both the air and solar heat exchangers collect heat energy from the outside ambient air. When solar radiant energy is available the solar heat exchanger also collects heat from that source. Both heat exchangers act as refrigerant evaporators. All heat is collected by the transfer medium (FREON 502) in the form of both latent and sensible heat, as in the refrigeration vaporization process, and is transferred by means of the piping to the compressor where its temperature and pressure is raised and the heat energy extracted in useful form by means of the above-mentioned heat exchangers and air-or water-cooled refrigerant condensers.

By using refrigerant in the solar heat exchanger, and by using the refrigeration cycle as a means of heat transfer, the solar heat exchanger plate temperature remains at all times much lower than the outside surrounding ambient temperature. This results in the greatest possible solar energy collector efficiency as compared to previous technology as air, fluid or evaporation refrigerant plates must operate at much higher surface temperatures than the prevailing ambient temperature. The response and energy collection of direct expansion refrigerant type solar insolation absorber panels is almost instantaneous with very little reflective loss, while heat can also be collected day or night, in good or bad weather. Thus, unlike other solar systems which rely on solar radiation alone this system may also obtain heat energy from the ambient air at all times and regardless of ambient conditions.

Preferably an electric defrost system is used to provide the defrost heat necessary to clear the outdoor air heat exchanger coil of accumulated ice and the defrost action may be initiated either by means of a time-initiated, temperature-terminated control system or by means of a demand defrost control system. The use of electric defrost avoids the need for a hot gas defrost system as in previous heat pump designs and its attendant difficulties. Similarly, the compressor does not have to cease pumping as in previous electric defrost systems, and it remains in operation collecting heat energy from the solar plate collector while the ambient air coil is defrosting. Also because of the provision of the evaporator pressure containment valve, most of the electrical energy used to defrost the ambient air coil is absorbed by the refrigerant and is utilized by the still operating compressor resulting in a high performance factor and economical operation.

The condensing process of the refrigeration cycle can be utilized in many variations by means of air or water heat exchangers for many varied usages. Primarily a system of this invention is intended to be utilized in conjunction with an air heat exchanger or condenser unit located in the return air plenum of a forced air heating/cooling system to provide space heating. By installing an evaporator heat exchanger unit in the supply side of such a system and use of reversing valves a cooling cycle is also possible. An advantage of using two separator indoor condenser and evaporator units is that it allows continuous operation of the heat cycle of the solar heat pump, while an back-up heating system, fuelled by gas, oil or electricity, is at the same time providing additional heat when required.

A system of the invention therefore has the advantage of allowing a heat pump to operate at high efficiency by using direct solar radiation as long as this is available. Also the solar heat exchanger at all times can function as an ambient air heat exchanger providing useful energy even during cloudy periods, darkness or adverse weather conditions. While low ambient temperatures lower the system efficiency slightly they do not stop the heat energy gathering process. Because the mechanical compressor runs continuously on demand of an indoor space or other thermostat the outdoor heat collecting solar exchangers can always be maintained several degrees below any prevailing ambient temperature, and there is little reflected or other loss of incident solar radiation. This results in simplified, smaller, less costly and fewer solar collectors which require no heat build-up before producing usable heat.

The parallel usage of the two different types of heat collector, along with the electric defrost and evaporator pressure containment valve allows on-demand continuous heating with no reversing or shut-down of the collecting process for defrost of the outdoor heat exchangers. This produces very high efficiencies particularly well suited to the climate encountered in Canada, Northern U.S.A. and Europe while minimizing the probability of compressor failure, resulting in low maintenance cost operation of the system.

DESCRIPTION OF THE DRAWINGS

A solar heat pump system which is a particular preferred embodiment of the invention will now be described, by way of example, with reference to the accompanying schematic drawing.

DESCRIPTION OF THE PREFERRED EMBODIMENTS

Figure 1:
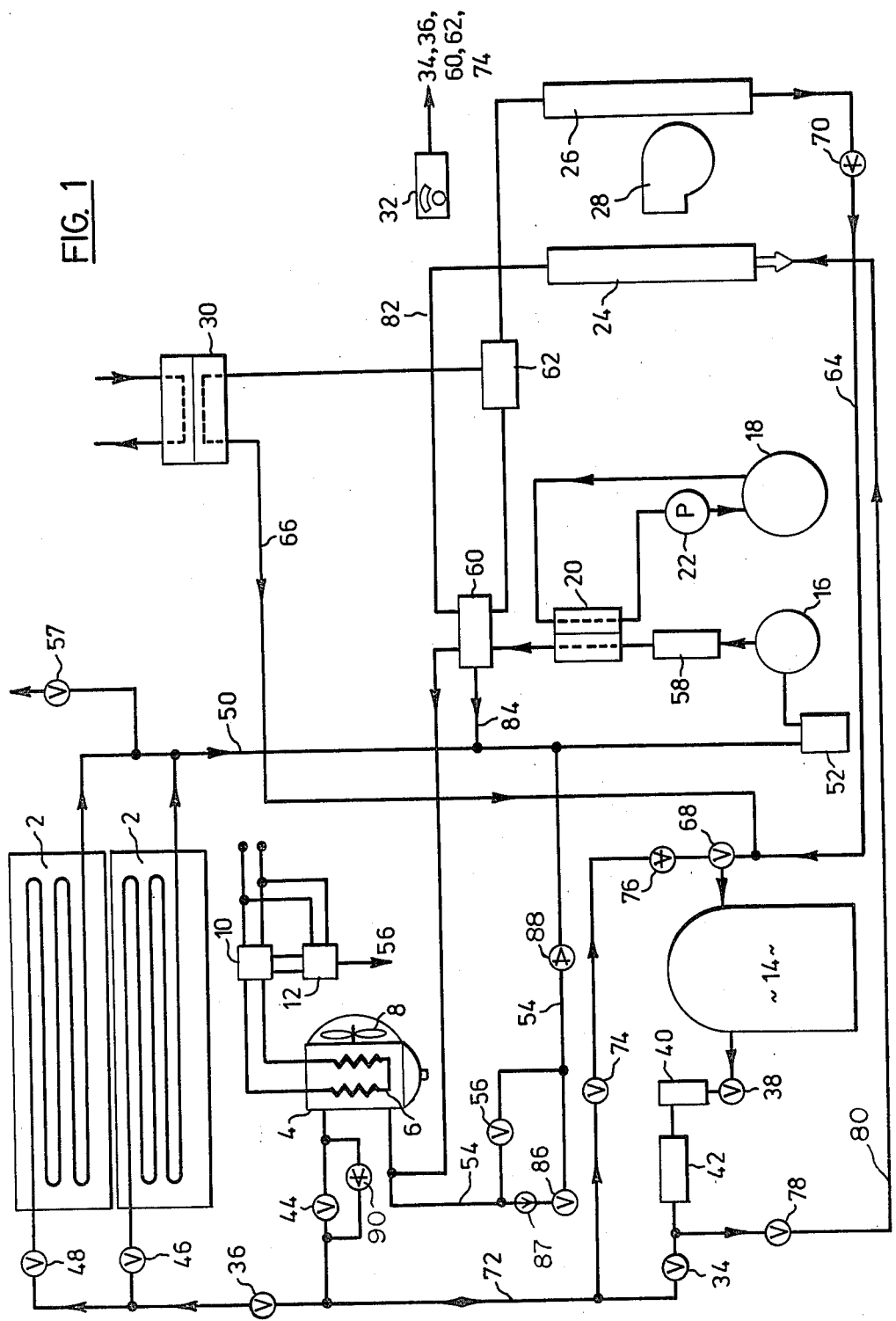

The solar heat pump system illustrated herein consists of the following principal components connected as described in detail hereinafter. Thus, a typical commercial or domestic installation will include at least one (two in this embodiment) outdoor solar energy absorber panels, 2 of any suitable form mounted and arranged on the building to be heated or on a separate structure for maximum energy absorption. The system also includes an heat absorber 4 of the type that obtains its heat input from the ambient air, this device including an air-moving fan 8 and electric defrost heaters 6 operated in response to closing of relay 10 under the control of thermostat and/or time clock 12. Alternatively the absorber 4 could obtain its heat from the ground and/or a suitable water supply, but air absorbers are generally the most common.

The operating fluid for the system is a halogenated carbon refrigerant liquid, such as those sold by DuPont Inc. under the Trade Mark "FREON" and particularly "FREON 502", and a quantity of this in liquid state is stored in a refrigerant storage tank 14; the compressor for operating the system is given the reference 16.

The "output" components of the system illustrated include a hot water storage tank 18 supplied via a heat exchanger 20 and thermostatically controlled feed pump 22; a space conditioning indoor cooling evaporator 24; a space conditioning indoor heat condenser exchanger 26; a space air circulating fan 28 and a liquid condenser heat exchanger 30 that can be used for any required auxiliary purpose, such as the heating of a sauna or a swimming pool.

The operation of the circuit will first be described when it is in its heating mode. Upon a call for heat by a thermostat 32 solenoid valves 34 and 36 are opened and liquid refrigerant passes from the storage tank 14 via outlet valve 38, liquid indicator 40, dryer 42 and respective thermostatic expansion valves 44, 46 and 48 to the interior of the absorbers 2 and 4. A check valve 90 prevents liquid refrigerant from by-passing valve 44. The thermostatic expansion valves operate in known manner to meter the liquid refrigerant into the absorber spaces where it is vaporized. The vapor flows from absorber 2 via pipe 50 and suction line accumulator 52 to the compressor 16, and from absorber 4 via pipe 54 which includes normally-open valve 56; a relief valve 57 in the pipe 50 will open if the vapor pressure becomes excessive. The hot pressurized vapor from the compressor 16 passes through muffler 58 and heat exchanger 20, where some of its heat content is transferred to a four-way valve 60 and thence to a three-way valve 62, both of which are under the control of the thermostat 32. The valves 60 and 62 direct the hot refrigement vapor to one or both of the two heat exchangers 26 and 30 where it is condensed, giving off both its latent and sensible heats. The resultant liquid is returned to the storage tank 14 via respective pipes 64 and 66 and inlet valve 68, the pipe 64 including also a check valve 70.

In the cooling mode of operation the four way valve 60 is operative to deliver hot vapor from the compressor 16 to the ambient air heat absorber 4, which now becomes the system condenser in which the vapor is cooled, the unit discharging heat to the ambient air while the condensed liquid returns to the storage tank 14 via pipe 72, solenoid valve 74 and check valve 76. A normally-closed valve 87 is provided in the pipe 54, this valve being closed during the cooling cycle. The valve 56 is only open during the heating cycle and the valve 87 is normally closed except during the defrost period of the heating cycle and hot vapor from the compressor cannot by-pass the cooling mode loop. Solenoid valve 78 is also open and liquid refrigerant is fed via pipe 80 to the indoor evaporator cooler 24, the vapor resulting from this evaporation passing through pipes 82 and 84 and valve 60 back to the compressor 16.

When operative in the heating mode frost builds up on the coils which provide the refrigerant receiving space of absorber 4 and must be removed from time to time. As described above, in the systems known to me hitherto this has resulted in difficulty and expensive energy loss which is avoided with the system of my invention. The defrost cycle can be initiated either at fixed intervals of time, when the control 12 will be a clock controller, or on demand when the temperature of the air passing over the coil indicates that defrost is needed, when control 12 will be a thermostat. Any other known system may be employed, such as a solid state demand system responsive to ice build-up on the coils. The control causes energization of the defrost heaters 6 and at the same time closes the valve 56 and opens the valve 87, so that pipe 54 is closed, except for the pressure containment valve 86. The vapor pressure now builds up in the coil of absorber 4 and is maintained at a minimum value by the pressure containment valve 86; if the pressure of the vapor is above that set by the valve 86 the excess vapor bleeds through the valve and returns via check valve 88 to the compressor. The regulating valve 86 thus maintains the pressure and the temperature of the vapor in the absorber coils above the melting point, resulting in defrost of the coils. In a typical system this valve will be set to hold the pressure above about 4.2 Kg/sq. cm. (60 p.s.i.). Because of the presence of the "frost-free" solar absorbers 2 the compressor need not be switched off, but can be allowed to run continuously during the defrost cycle; because the compressor is still operating heat is still being collected from the absorbers 2 and passed to the indoor heater 26. Moreover, the considerable quantity of heat that is involved in the unavoidable evaporation of the refrigerant is no longer lost, but is now fed to the exchangers 20, 26, 30, etc. and utilised therein. The only heat lost from the system is the latent heat required to actually melt the ice that has accumulated on the coils and a minimal loss to the ambient air. Again, since the compressor can be allowed to operate continuously during the defrost a much longer period can be taken for defrosting, so that a smaller defrost heater can be employed. For example, in a system in which the unit 4 is rated at 16,000 b.t.u., a defrost heater 6 of 2 Kilowatts is completely satisfactory.

While the invention has been described and illustrated by reference to specific embodiments thereof, such description and illustration is by way of example only and not intended in any limiting sense. For example, although the system described employs both solar and ambient air energy absorbers, and the compressor is run continuously the system remaining in operation with the solar absorber being effective, it will be apparent that instead two ambient air energy absorbers could be operative in parallel, one of which continues operation while the other is being defrosted.

I claim:

1. A heat pump system comprising:
   (a) first and second heat exchangers having respective first and second refrigerant receiving spaces and operative in the system heating mode as respective refrigerant evaporators extracting heat from their surroundings with vaporization of liquid refrigerant therein;
   (b) a third heat exchanger having a respective third refrigerant receiving space and also operative in the system heating mode as a refrigerant condenser so as to deliver heat to its surroundings;
   (c) a refrigerant compressor;
   (d) pipe means connecting the said first, second and third exchangers and the compressor to receive vaporized refrigerant from said first and second exchangers and to deliver compressed refrigerant to the third exchanger;
   (e) defrost heat supply means for supply of defrost heat to at least the said first exchanger space;
   (f) a pressure containment valve between the first exchanger space and the compressor and when operative adapted to maintain the refrigerant vapor in the first space at a pressure and temperature above that at which defrosting will take place, and to release refrigerant vapor at a greater pressure to the compressor; and
   (g) control means operative to produce a defrost cycle, said control means actuating the said defrost heat supply means to supply defrost heat to the first space and also rendering the pressure containment valve operative.

2. A system as claimed in claim 1, wherein the pressure containment valve has a normally-open valve connected in parallel therewith, and the control means are operative to render the pressure containment valve operative by closing the said normally-open valve.

3. A system as claimed in claim 1, wherein the said defrost heat supply means is at least one electric heater in heat exchange relationship with the said first refrigerant receiving space.

4. A system as claimed in claim 3, wherein said second heat exchanger is of solar insolation absorbing refrigerant type connected in parallel with the said first exchanger.

5. A system as claimed in claim 1, wherein said second heat exchanger is of solar insolation absorbing refrigerant type connected in parallel with the said first exchanger.

6. A system as claimed in claim 1, and including at least one additional heat exchanger supplied with pressurized refrigerant vapor from the compressor and extracting heat therefrom by condensation of the refrigerant.

7. A system as claimed in claim 1, and including a fourth evaporative heat exchanger having a respective fourth refrigerant receiving space and operative in a system cooling mode as a refrigerant evaporator so as to remove heat from its surroundings, the said pipe means also connecting the said fourth exchanger and the compressor.

8. A system as claimed in claim 1, wherein said second heat exchanger is of solar insolation absorbing refrigerant type connected in parallel with the said first exchanger;

wherein the said defrost heat supply means is at least one electric heater in heat exchange relationship with the said first refrigerant receiving space; and including a fourth evaporative heat exchanger having a respective fourth refrigerant receiving space and operative in a system cooling mode as a refrigerant evaporator so as to remove heat from its surroundings, the said pipe means also connecting the said fourth exchanger and the compressor.

* * * * *